(12) United States Patent
Lee et al.

(10) Patent No.: US 10,453,489 B1
(45) Date of Patent: Oct. 22, 2019

(54) SIGNAL DETECTION METHOD OF STAGGERED TWO-DIMENSIONAL BIT-PATTERNED MEDIA, RECORDING MEDIUM AND APPARATUS FOR PERFORMING THE METHOD

(71) Applicant: Foundation of Soongsil University-Industry Cooperation, Seoul (KR)

(72) Inventors: Jaejin Lee, Seoul (KR); Seongkwon Jeong, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 16/236,029

(22) Filed: Dec. 28, 2018

(30) Foreign Application Priority Data

Aug. 3, 2018 (KR) ........................ 10-2018-0090864

(51) Int. Cl.
G11B 20/10 (2006.01)
G11B 7/0065 (2006.01)
G11B 5/74 (2006.01)
G11B 5/02 (2006.01)

(52) U.S. Cl.
CPC ............... *G11B 5/746* (2013.01); *G11B 5/02* (2013.01); *G11B 20/10268* (2013.01)

(58) Field of Classification Search
CPC ........ G11B 20/10046; G11B 20/10055; G11B 20/10037; G11B 2220/2504; G11B 7/0065; H04N 5/89

USPC ............................................... 369/103, 59.22
See application file for complete search history.

(56) References Cited

U.S. PATENT DOCUMENTS

2013/0120848 A1* 5/2013 Cossairt ............. G02B 27/2214
359/619

FOREIGN PATENT DOCUMENTS

JP           2011-070769 A      4/2011
KR    10-2009-0074141 A      7/2009
KR         10-1282838 B1      7/2013
(Continued)

*Primary Examiner* — Nabil Z Hindi
(74) *Attorney, Agent, or Firm* — Novick, Kim & Lee, PLLC; Sang Ho Lee

(57) ABSTRACT

Provided is a signal detection method of a staggered two-dimensional bit-patterned media and a recording medium and an apparatus for performing the method. The signal detection method of staggered two-dimensional bit-patterned media includes the down-track detection step, which detects a signal through a horizontal direction (x) path along the down-track, the first cross-track detection step, which detects a signal through a first vertical direction ($z_1$) path that allows for passing through of a plurality of pixels arranged on a same line along cross-track perpendicular to the down-track and a plurality of pixels arranged in a staggered manner toward the horizontal direction (x) path with respect to the cross-track, and the second cross-track detection step, which detects a signal through a second vertical direction ($z_2$) path that allows for passing through of a plurality of pixels arranged on a same line along the cross-track and a plurality of pixels arranged in a staggered manner toward an opposite path to the horizontal direction (x) path with respect to the cross-track.

10 Claims, 8 Drawing Sheets

(56) References Cited

FOREIGN PATENT DOCUMENTS

KR    10-1452253  B1    10/2014

\* cited by examiner

SIGNAL DETECTION METHOD OF STAGGERED TWO-DIMENSIONAL BIT-PATTERNED MEDIA, RECORDING MEDIUM AND APPARATUS FOR PERFORMING THE METHOD

CROSS-REFERENCE TO RELATED APPLICATIONS

This application claims priority under 35 U.S.C. § 119 to Korean Patent Application No. 10-2018-0090864, filed on Aug. 3, 2018, in the Korean Intellectual Property Office, the disclosure of which is incorporated herein by reference in its entirety.

TECHNICAL FIELD

The present disclosure relates to a signal detection method of a staggered two-dimensional bit-patterned media, a recording medium, an apparatus for performing the method, and more particularly, to a signal detection method of staggered two-dimensional bit-patterned media which is applied to storage media or communication media, and lastly a recording medium and an apparatus for performing the method.

BACKGROUND ART

Recently, with the rapid industrialization and informationization, the amount of available information increases sharply, requiring high density of information recording and reproducing devices.

The bit-patterned media has a recording layer, on which information is recorded, in patterns of bit pixels that are the recording unit of information, and is receiving the spotlight due to the high record density.

In order to achieve high recording density, two-dimensional (2D) bit-patterned media which has down-track and cross-track have been proposed. However, 2D bit-patterned media causes interference between signals in a short distance between the down-track and the cross-track.

Meanwhile, soft output Viterbi algorithm (S OVA) tracks data received through several different paths, and selects a path with highest likelihood among them, and lastly selects data of the selected path.

The conventional signal detection method of 2D bit-patterned media applies SOVA to each of the down-track and cross-track, which obtains two output values, and averages them to detects an output signal.

However, when pixels are arranged with delays between adjacent down-tracks, the conventional signal detection method which only considers the down-track direction and the cross-track direction cannot recognize all of the affected neighboring pixels.

DISCLOSURE

Technical Problem

An aspect of the present disclosure provides a signal detection method of the staggered two-dimensional bit-patterned media for detecting a signal through three paths including a horizontal direction (x) path, a first vertical direction ($z_1$) path, a second vertical direction ($z_2$) path that allows for passing through of pixels arranged in a staggered manner along vertical direction (z), a recording medium, and an apparatus for performing the method.

Technical Solution

In order to achieve the above-described object, according to one embodiment of the present disclosure, a signal detection method of staggered two-dimensional bit-patterned media in which a first plurality of pixels arranged at equal distances along down-track are arranged in a staggered manner with a second plurality of pixels arranged along adjacent down-track, where the first plurality of pixels and the second plurality of pixels are arranged in turn is provided.

The signal detection method of the staggered two-dimensional bit-patterned media includes a down-track detection step of detecting a horizontal signal through a horizontal direction (x) path along the down-track, a first cross-track detection step of detecting a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track, and a second cross-track detection step of detecting a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

In addition, the signal detection method of the staggered two-dimensional bit-patterned media further includes calculating an output signal by averaging output values outputted from the down-track detection step, the first cross-track detection step, and the second cross-track detection step.

The first cross-track detection step may include generating the first vertical direction ($z_1$) path in a zigzag shape passing through pixels arranged in a staggered manner closest to the horizontal direction (x) path with respect to the cross-track from pixels arranged on a same line along the cross-track, and detecting the first signal along the first vertical direction ($z_1$) path.

The second cross-track detection step may include generating the second vertical direction ($z_2$) path in a zigzag shape passing through pixels arranged in a staggered manner closest to an opposite path to the horizontal direction (x) path with respect to the cross-track from pixels arranged on a same line along the cross-track, the second vertical direction ($z_2$) path being symmetrical to the first vertical direction ($z_1$) path with respect to the cross-track, and detecting the second signal along the second vertical direction ($z_2$) path.

The signal detection method of the staggered two-dimensional bit-patterned media may further include adding Additive White Gaussian Noise (AWGN) to an input signal to generate a readback signal, adjusting the readback signal to a preset partial response (PR) target of the down-track to generate a first equalized signal, adjusting the readback signal to a preset PR target of the cross track to generate a second equalized signal, and outputting output values by applying the first equalized signal to the down-track detection step, and the second equalized signal to the first cross-track detection step and the second cross-track detection step.

The down-track detection step, the first cross-track detection step, and the second cross-track detection step comply with a soft output Viterbi algorithm.

According to another embodiment of the present disclosure, a non-transitory computer-readable recording medium having thereon a computer program for performing a signal detection method of staggered two-dimensional bit-patterned media in which a first plurality of pixels arranged at equal distances along down-track are arranged in a staggered manner with a second plurality of pixels arranged along adjacent down-track, where the first plurality of pixels and the second plurality of pixels are arranged in turn is provided. The signal detection method of the staggered two-dimensional bit-patterned media includes a down-track detection step of detecting a horizontal signal through a horizontal direction (x) path along the down-track, a first cross-track detection step of detecting a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track, and a second cross-track detection step of detecting a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

In addition, according to the other embodiment of the present disclosure, a signal detection apparatus of staggered two-dimensional bit-patterned media in which a first plurality of pixels arranged at equal distances along down-track are arranged in a staggered manner with a second plurality of pixels arranged along adjacent down-track, where the first plurality of pixels and the second plurality of pixels are arranged in turn is provided. The signal detection apparatus of the staggered two-dimensional bit-patterned media includes a processor and a memory, a down-track detector which detects a horizontal signal through a horizontal direction (x) path along the down-track, a first cross-track detector which detects a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track, and a second cross-track detector which detects a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

The signal detection apparatus of the staggered two-dimensional bit-patterned media may further include an averaging unit which calculates an output signal by averaging output values outputted from the down-track detector, the first cross-track detector, and the second cross-track detector.

The signal detection apparatus of the staggered two-dimensional bit-patterned media may further include: a down-track equalizer which adjusts a readback signal to a preset partial response (PR) target of the down track to generate a first equalized signal, the readback signal in which Additive White Gaussian Noise (AWGN) is added to an input signal, and a cross-track equalizer which adjusts the readback signal to a preset PR target of the cross track to generate a second equalized signal.

Advantageous Effects

According to the present disclosure, due to the passing through all adjacent pixels which are influenced by the staggered two-dimensional bit-patterned array structure, the signal detection performance may improve as compared to a signal detection apparatus 1D SOVA having one signal detection path and a signal detection apparatus 2D SOVA having two signal detection paths.

BEST MODE

Figure 1:
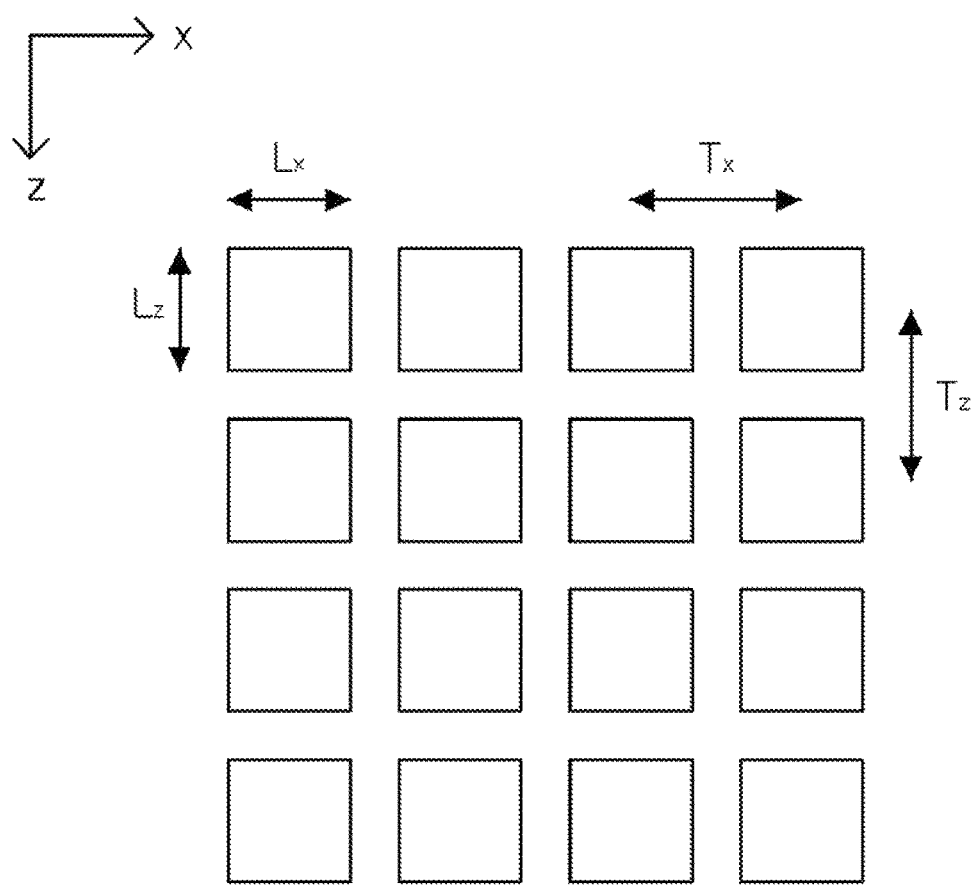
FIG. 1 is a diagram illustrating a general array structure of two-dimensional (2D) bit-patterned media.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects Hereinafter, preferred embodiments of the present disclosure will be described in more detail with reference to the accompanying drawings.

Figure 2:
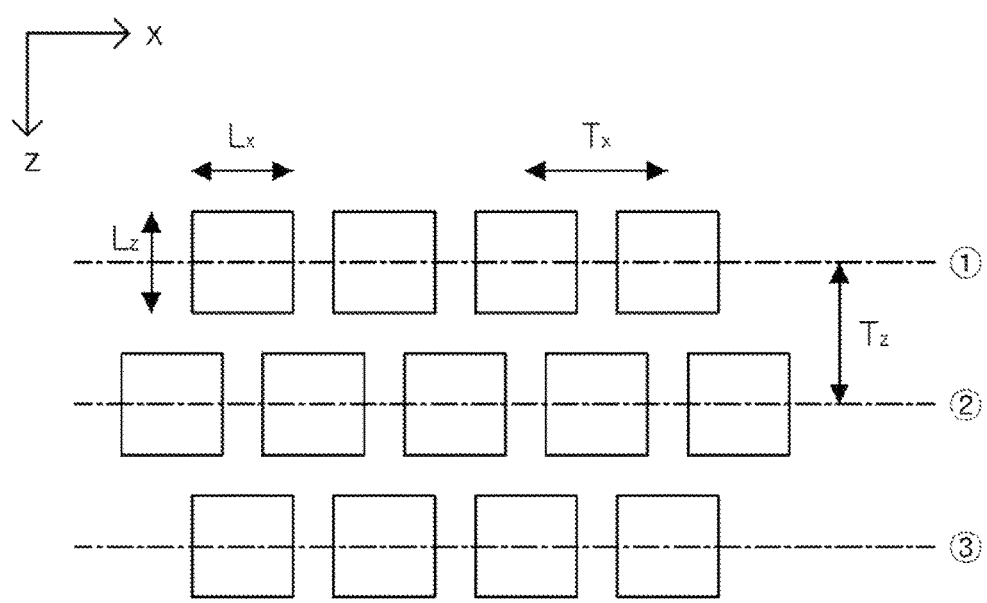
FIG. 2 is a diagram illustrating a staggered array structure of 2D bit-patterned media according to the present disclosure.

FIG. 1 is a diagram illustrating a general array structure of two-dimensional (2D) bit-patterned media, and FIG. 2 is a diagram illustrating a staggered array structure of 2D bit-patterned media according to the present disclosure.

The 2D bit-patterned media have a recording layer, on which information is recorded, in patterns of bit pixels that are the recording unit of information, and may be applied to storage devices such as hard disk or communication systems.

The 2D bit-patterned media may have a general array structure as shown in FIG. 1, or a staggered array structure as shown in FIG. 2 depending on the patterning (lithography approach).

In the following description, the horizontal direction (x) and vertical direction (z) are shown on the basis of the drawings, and do not have the absolute meaning.

Referring to FIG. 1, the 2D bit-patterned media may include a plurality of down-tracks $T_x$ along the horizontal direction (x) and a plurality of cross-tracks $T_z$ along the vertical direction (z).

The plurality of down-tracks $T_x$ and the plurality of cross-tracks $T_z$ may be each formed at equal distances, and a plurality of pixels may be arranged with the center disposed at the intersection of down-track $T_x$ and cross-track $T_z$.

In the case of this array, a pixel is influenced by four adjacent pixels on the upper, lower, left and right sides with respect to the pixel. Accordingly, in detecting a signal from the 2D bit-patterned media having this array, it may be performed by detecting a signal along the horizontal direction (x), detecting a signal along the vertical direction (z), averaging output values, and detecting an output signal.

In contrast, referring to FIG. 2, the 2D bit-patterned media of the present disclosure may include a plurality of down-tracks $T_x$ along horizontal direction (x), and a plurality of pixels may be arranged at equal distances along down-track $T_x$. However, the plurality of pixels may be arranged in a staggered manner with a plurality of pixels arranged along the adjacent down-track $T_x$, and may have a staggered arrangement in vertical direction (z).

For example, a plurality of pixels arranged in a first down-track $T_x(①)$ may be arranged such that the center coordinate on the horizontal direction (x) axis is staggered by $x_0$ from the center coordinate on the horizontal direction (x) axis of pixels arranged on a second down-track $T_x(②)$. In this instance, when the length on the horizontal direction (x) axis of pixel is set to 1, $x_0$ may be 0.5 or greater, and 1 or less. The present disclosure will be described by taking $x_0$ of 0.5 as an example.

The plurality of pixels arranged in the first down-track $T_x(①)$ and a plurality of pixels arranged in a third down-track $T_x(③)$ may be arranged on the same line of cross-track $T_z$, and the plurality of pixels arranged in the second down-track $T_x(②)$ may be arranged in a staggered manner in horizontal direction (x) with respect to the corresponding cross-track T.

In the case of this array, a pixel is influenced by a total of six pixels including the two adjacent pixels on the upper side, two adjacent pixels on the lower side and two adjacent pixels on the left and right sides with respect to the pixel.

Therefore, signal detection apparatus of staggered 2D bit-patterned media according to an embodiment of the present disclosure may detect a signal along the horizontal direction (x) path, generate two paths that allow for the passing through of pixels arranged in a staggered manner along the vertical direction (z) and respectively detect a signal, and average output values, and detect an output signal.

Figure 3:
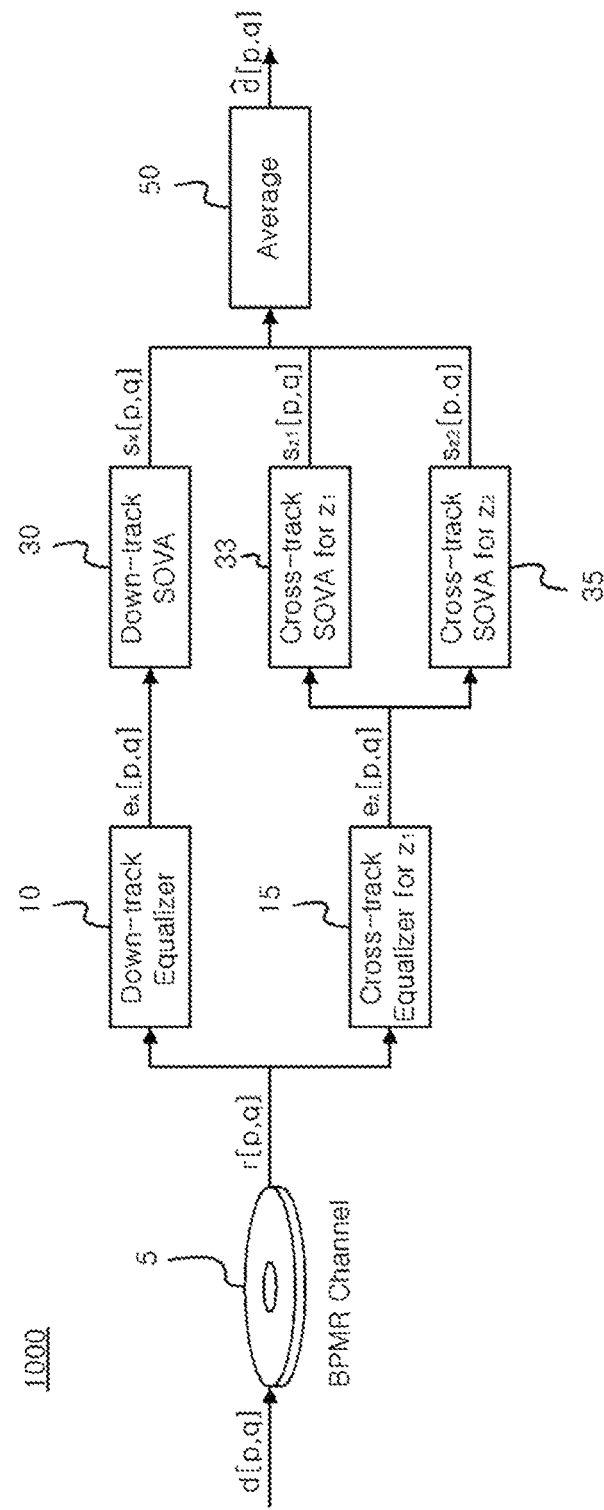
FIG. 3 is a block diagram of a signal detection apparatus of staggered 2D bit-patterned media according to an embodiment of the present disclosure.

FIG. 3 is a block diagram of the signal detection apparatus of the staggered 2D bit-patterned media according to an embodiment of the present disclosure.

Referring to FIG. 3, the signal detection apparatus 1000 of staggered 2D bit-patterned media (hereinafter apparatus) according to the present disclosure may include a down-track equalization unit 10, a cross-track equalization unit 15, a down-track detection unit 30, a first cross-track detection unit 33, a second cross-track detection unit 35 and an averaging unit 50.

The apparatus 1000 according to the present disclosure may detect an output signal $\hat{d}[p, q]$ for an input signal $d[p, q]$ having passed through a channel 5. Here, as it passes through the channel 5, the input signal $d[p, q]$ may be a readback signal $r[p, q]$ with an addition of Additive White Gaussian Noise (AWGN).

An information recording or reproducing device including bit-patterned media may include a head that records information on the bit-patterned media or reproduces the recorded information.

The apparatus 1000 according to the present disclosure may replace the head of the information recording or reproducing device. In particular, the apparatus 1000 according to the present disclosure is useful in recording information on staggered 2D bit-patterned media or reproducing the recorded information as shown in FIG. 2.

The apparatus 1000 according to the present disclosure may be a separate terminal or a certain module of the terminal. Additionally, the down-track equalization unit 10, the cross-track equalization unit 15, the down-track detection unit 30, the first cross-track detection unit 33, the second cross-track detection unit 35 and the averaging unit 50 may be incorporated into an integrated module, or may be formed as at least one module. On the contrary, each element may be a separate module.

The apparatus 1000 according to the present disclosure may have mobility, or may be stationary. The apparatus 1000 according to the present disclosure may be in the form of a server or an engine, and may also be called a device, an apparatus, a terminal, user equipment (UE), a mobile station (MS), a wireless device and a handheld device.

The apparatus 1000 according to the present disclosure may execute or create various types of software based on Operation System (OS), i.e., system. The OS is a system program for enabling software to use the hardware of the apparatus, and may include mobile computer OSs such as Android OS, iOS, Window Mobile OS, Bada OS, Symbian OS and Blackberry OS and computer OSs such as Windows-based, Linux-based, Unix-based, MAC, AIX and HP-UX.

The apparatus 1000 according to the present disclosure may run the software (application) to perform a signal detection of staggered 2D bit-patterned media installed thereon, and the down-track equalization unit 10, the cross-track equalization unit 15, the down-track detection unit 30, the first cross-track detection unit 33, the second cross-track detection unit 35 and the averaging unit 50 may be controlled by the software that runs on the apparatus 1000.

Each element of the apparatus 1000 according to the present disclosure will be described briefly below, and a signal detection method of the staggered 2D bit-patterned media according to the present disclosure will be described in detail with reference to FIG. 4 and other subsequent figures.

Each of the down-track equalization unit 10 and the cross-track equalization unit 15 may process a readback signal r[p, q] in the form of partial response (PR) pulse.

The down-track equalization unit 10 and the cross-track equalization unit 15 may be a 2D equalizer. For example, the down-track equalization unit 10 and the cross-track equalization unit 15 may be 5λ5 2D, and may be implemented as a 2D finite impulse response (FIR) filter.

The down-track equalization unit 10 may adjust the readback signal r[p, q] to a preset horizontal direction (x) partial response (PR) target to output a first equalized signal $e_x[p, q]$. This embodiment is described, taking the horizontal direction (x) PR target set to 1λ3 as an example.

The down-track equalization unit 10 may output the first equalized signal $e_x[p, q]$ according to the following Equations 1 and 2.

$$e_x[p,q]r[p,q]\otimes C[p,q] \qquad \text{[Equation 1]}$$

In Equation 1, C[p, q] is 5×5 equalizer constant, and may be updated by the least mean square (LMS) algorithm, and is as shown in the following Equation 2.

$$C_{n+1}[p,q]=C_n[p,q]+2\mu((d[p,q]\otimes f_x[q])-e_x[p,q])r_n[p,q], \qquad \text{[Equation 2]}$$

In Equation 2, $C_{n+1}[p, q]$ denotes the updated equalizer constant, $C_n[p, q]$ denotes the current equalizer constant, $\mu$ denotes the adaptation gain, $\otimes$ denotes the convolution, and $f_x[q]$ denotes 1×3 PR target.

The cross-track equalization unit 15 may adjust the readback signal r[p, q] to a preset vertical direction (z) partial response (PR) target to output a second equalized signal ($e_z[p, q]$). This embodiment is described, taking the vertical direction (z) PR target set to 3×1 as an example.

The cross-track equalization unit 15 may output the second equalized signal $e_z[p, q]$ according to the above Equations 1 and 2 in the same way as the down-track equalization unit 10. However, in Equation 2, $f_x[q]$ may be substituted by the vertical direction (z) PR target, $f_z[p]=3\times 1$.

The down-track detection unit 30, the first cross-track detection unit 33 and the second cross-track detection unit 35 may detect a signal from the staggered 2D bit-patterned media as shown in FIG. 2 by applying various path tracking algorithms. The path tracking algorithms may include soft output Viterbi algorithm (SOVA) and Bahl, Cocke, Jelinek and Raviv (BCJR) algorithm, and the following description and drawings will be described, taking the application of soft output Viterbi algorithm as an example.

The down-track detection unit 30 may generate a horizontal direction (x) path along down-track, and detect a signal along the horizontal direction (x) path. The down-track detection unit 30 may output an output value ($s_x[p, q]$) corresponding to the horizontal direction (x) PR target using the first equalized signal ($e_x[p, q]$) outputted from the down-track equalization unit 10 as an input signal. The down-track detection unit 30 may calculate the output value through the horizontal direction (x) path along down-track as shown in the following Equation 3.

$$\lambda_{p,q}[s_j,s_k]=\{e_x[p,q]-(f_h[0]\cdot\hat{a}_{p,q+1}(s_k)+f_h[1]\cdot\hat{a}_{p,q}(s_j)+f_h[2]\cdot\hat{a}_{p,q-1}(s_j))\}^2\} \qquad \text{[Equation 3]}$$

In Equation 3, $s_j$, $s_k$, $\hat{a}(s_j)$ and $a(s_k)$ denote the current status, the next status, and values determined at $s_j$ and $s_k$, respectively.

The first cross-track detection unit 33 and the second cross-track detection unit 35 may detect a signal through a vertical direction (z) path along cross-track perpendicular to down-track. The first cross-track detection unit 33 and the second cross-track detection unit 35 may generate a first vertical direction ($z_1$) path and a second vertical direction ($z_2$) path that allow for passing through pixels arranged in a staggered manner along the vertical direction (z), and detect a signal through the first vertical direction ($z_1$) path and the second vertical direction ($z_2$) path respectively.

Accordingly, each of the first cross-track detection unit 33 and the second cross-track detection unit 35 may output two output values $s_{z1}[p, q]$, $s_{z2}[p, q]$ corresponding to the vertical direction (z) PR target using the second equalized signal $e_z[p, q]$ outputted from the cross-track equalization unit 15 as an input signal.

The first cross-track detection unit 33 and the second cross-track detection unit 35 may calculate the output values through the first vertical direction ($z_1$) path and the second vertical direction ($z_2$) path as shown in the following Equations 4 and 5 respectively, in the same way as the down-track detection unit 30.

$$\lambda_{p,q}[s_j,s_k]=\{e_z[p,q]-(f_v[0]\cdot a_{p+1,q}(s_k)+f_v[1]\cdot\hat{a}_{p,q}(s_j)+f_v[2]\cdot a_{p-1,q}(s_j))\}^2\} \qquad \text{[Equation 4]}$$

$$\lambda_{p,q}[s_j,s_k]=\{e_z[p,q]-(f_v[0]\cdot a_{p+1,q+1}(s_k)+f_v[1]\cdot\hat{a}_{p,q}(s_j)+f_v[2]\cdot\hat{a}_{p-1,q+1}(s_j))\}^2\} \qquad \text{[Equation 5]}$$

Each variable in Equations 4 and 5 is as shown in Equation 3.

The averaging unit 50 may calculate an output signal $\hat{d}[p,q]$ by averaging the output values $s_x[p,q]$, $s_{z1}[p, q]$, $s_{z2}[p, q]$ outputted from the down-track detection unit 30, the first cross-track detection unit 33 and the second cross-track detection unit 35.

$$\hat{d}[p, q] = \begin{cases} 1, & \text{if } (s_x[p, q] + s_{z1}[p, q] + s_{z2}[p, q])/3 \geq 0 \\ 0, & \text{else} \end{cases} \qquad \text{[Equation 6]}$$

In Equation 6, $s_x[p, q]$, $s_{z1}[p, q]$ and $s_{z2}[p, q]$ denote the output values outputted from the down-track detection unit 30, the first cross-track detection unit 33 and the second cross-track detection unit 35, respectively.

The averaging unit 50 may average the output values $s_x[p, q]$, $s_{z1}[p, q]$, $s_{z2}[p, q]$ outputted from the down-track detection unit 30, the first cross-track detection unit 33 and the second cross-track detection unit 35 as shown in Equation 6, and calculate an output signal $\hat{d}[p,q]$ for the input signal d[p, q] according to the average value.

As described above, the apparatus 1000 according to an embodiment of the present disclosure detects a signal through three paths including the horizontal direction (x) path and the first vertical direction ($z_1$) path and the second vertical direction ($z_2$) path that allow for the passing through of pixels arranged in a staggered manner along the vertical direction (z), thereby increasing the accuracy in detecting a signal from the staggered 2D bit-patterned media as shown in FIG. 2.

Figure 4:
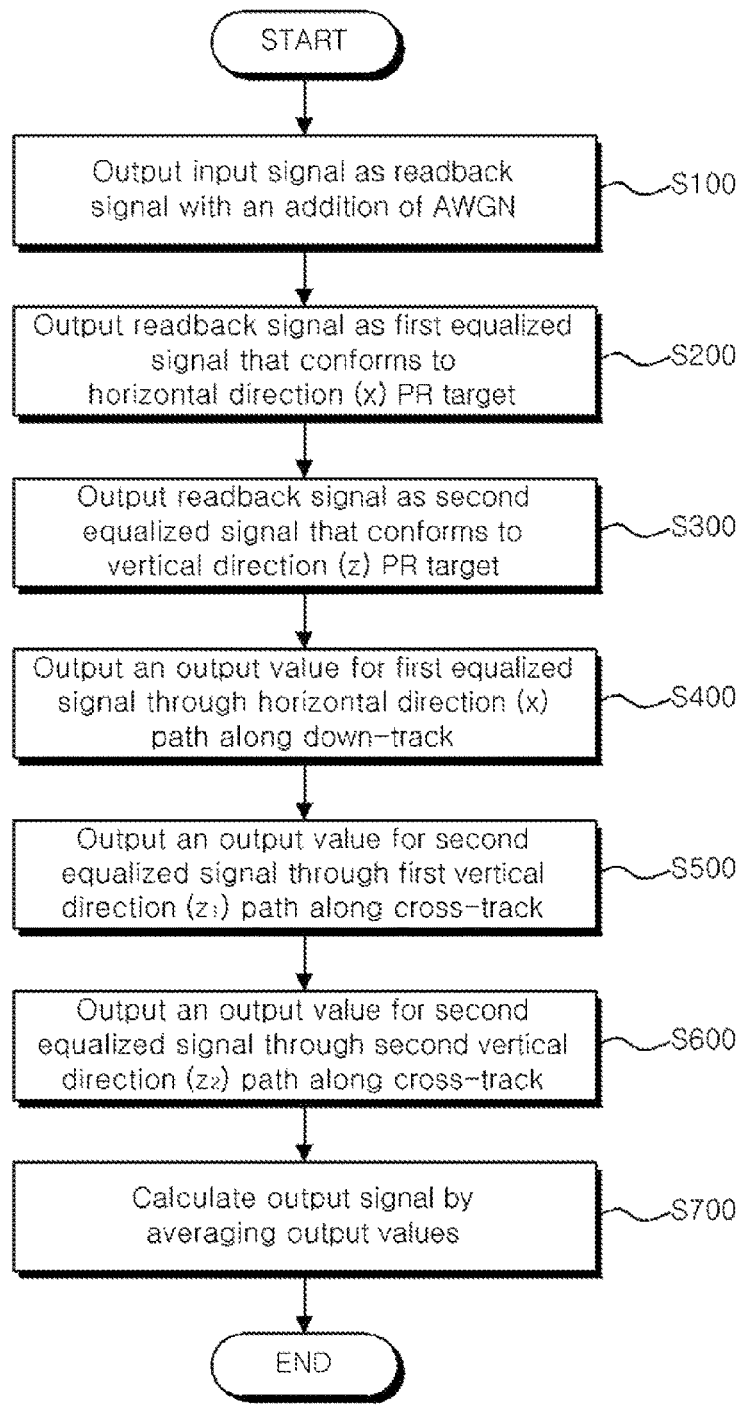
FIG. 4 is a flowchart illustrating a signal detection method of staggered 2D bit-patterned media according to an embodiment of the present disclosure.

FIG. 4 is a flowchart illustrating the signal detection method of the staggered 2D bit-patterned media according to an embodiment of the present disclosure.

The signal detection method of the staggered 2D bit-patterned media according to this embodiment may be performed substantially in the same configuration as the apparatus 1000 of FIG. 3. Accordingly, the same elements as those of the apparatus 1000 of FIG. 3 are given the same reference signs, and an overlapping description is omitted herein. Additionally, the signal detection method of staggered 2D bit-patterned media according to this embodiment may be performed by software (application) for signal detection of staggered 2D bit-patterned media.

Referring to FIG. 4, an input signal d[p, q] may be outputted as a readback signal r[p, q] with an addition of AWGN (S100).

As it passes through the channel 5, the input signal d[p, q] may be outputted as the readback signal r[p, q] with an addition of Additive White Gaussian Noise (AWGN).

Figure 5:
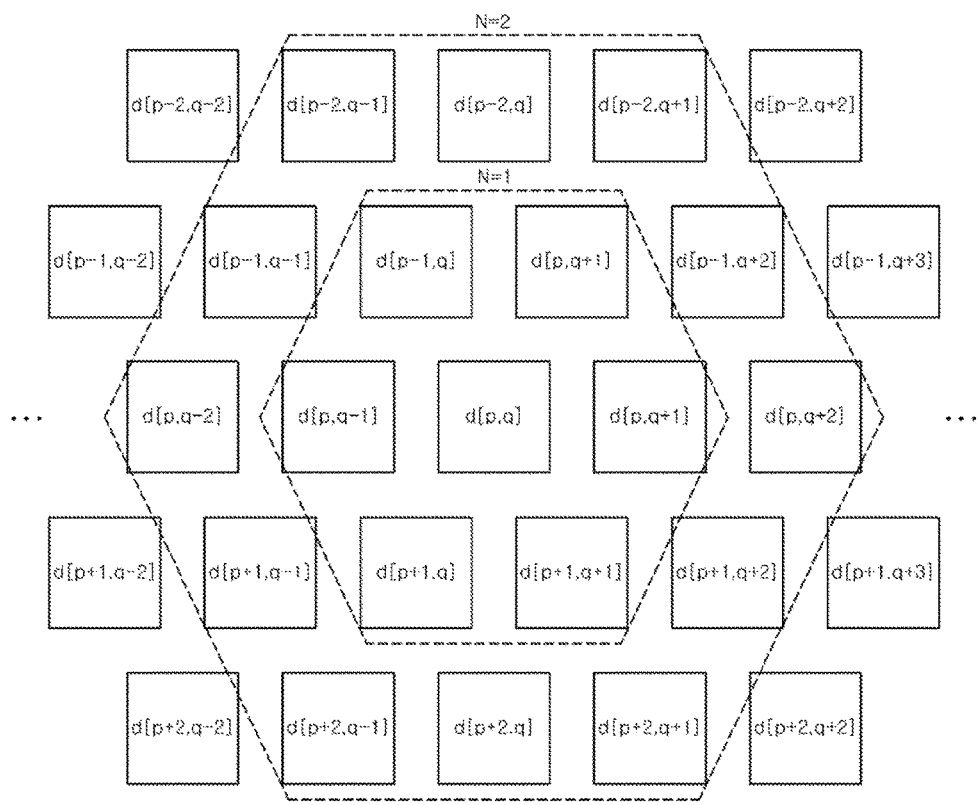
FIG. 5 is a diagram illustrating a method of outputting a readback signal according to the present disclosure.

FIG. 5 is a diagram illustrating a method of outputting a readback signal according to the present disclosure.

FIG. 5 is described, taking a method for outputting a readback signal from staggered 2D bit-patterned media as an example.

Binary user data $a[k] \in \{0, 1\}$ may be converted to a 2D input signal $d[p, q] \in \{1, 1\}$, and pass through the channel 5.

A 2D Gaussian pixel pulse response signal P(x, z) including noise of patterned media may be represented as shown in the following Equation 7.

$$P(x, z) = A \exp\left\{-\frac{1}{2c^2}\left[\left(\frac{x+\Delta_x}{PW_x}\right)^2 + \left(\frac{z+\Delta_z}{PW_z}\right)^2\right]\right\}, \quad \text{[Equation 7]}$$

In Equation 7, x and z denote down-track and cross-track directions respectively, and $\Delta_x$ and $\Delta_z$ denote variations of down-track and cross-track positions respectively. Additionally, in Equation 7, c denotes a relationship between the standard deviation of Gaussian function 1/2.3548 and PW50. Additionally, in Equation 7, $PW_x$ and $PW_z$ denote PW50 of down-track and cross-track pulses respectively.

The 2D pixel pulse response of the channel 5 may be represented as shown in the following Equation 8.

$$h(m,n) = P(nT_x, mT_z + \Delta_{off}), \quad \text{[Equation 8]}$$

In Equation 8, m and n denote the number of discrete pixels in the down-track and cross-track directions respectively, Tx and Tz denote the bit pitch and the track pitch respectively, and $\Delta_{off}$ denotes the offset of the head.

Here, the head, i.e., the apparatus 1000 according to an embodiment of the present disclosure reads a signal from 2D bit-patterned media, and the center location of the main data track cannot be maintained, causing track mis-registration (TMR).

TMR may be represented as a relationship between the head offset and the track pitch as shown in the following Equation 9.

$$TMR(\%) = \frac{\Delta_{off}}{T_z} \times 100. \quad \text{[Equation 9]}$$

From this, the readback signal r[p, q] with an addition of AWGN may be outputted as shown in the following Equation 10.

$$r[p, q] = d[p, q] \otimes h(m, n) + n[p, q] \quad \text{[Equation 10]}$$

$$= \sum_{n=-N}^{N} d[p, q+n] \cdot h(m, n) +$$

$$\sum_{m=0}^{\lfloor (N-1)/2 \rfloor} \sum_{n=-N+m+1}^{N-m} d[p - (2m+1), q+n] \cdot h\left(n - \frac{1}{2}, -(2m+1)\right) +$$

$$\sum_{m=0}^{\lfloor (N-1)/2 \rfloor} \sum_{n=-N+m+1}^{N-m} d[p + (2m+1), q+n] \cdot h\left(n - \frac{1}{2}, (2m+1)\right) +$$

$$\sum_{m=1}^{\lfloor N/2 \rfloor} \sum_{n=-N+m}^{N-m} d[p - 2m, q+n] \cdot h(n, -2m) +$$

$$\sum_{m=1}^{\lfloor N/2 \rfloor} \sum_{n=-N+m}^{N-m} d[p + 2m, q+n] \cdot$$

$$h(n, 2m) + n[p, q],$$

In Equation 10, n[p, q] denotes electron noise modeled using variance $\sigma^2$ and additive white Gaussian noise (AWGN) with zero mean, and N denotes the length of interference with neighboring pixels in FIG. 5. In this instance, when $1<N\leq2$, interference with neighboring pixels is nearly close to 0, and in this embodiment, it is regarded as N=1.

The readback signal r[p, q] may be outputted as a first equalized signal $e_x[p, q]$ that conforms to a horizontal direction (x) PR target (S200).

The readback signal r[p, q] may be 5×5 2D, and may be inputted into the down-track equalization unit 10 implemented as a 2D finite impulse response (FIR) filter and outputted as the first equalized signal $e_x[p, q]$ according to Equations 1 and 2.

Additionally, the readback signal r[p, q] may be outputted as a second equalized signal $e_z[p, q]$ that conforms to a vertical direction (z) PR target (S300).

The readback signal r[p, q] may be 5×5 2D, and may be inputted into the cross-track equalization unit 15 implemented as a 2D finite impulse response (FIR) filter and outputted as the second equalized signal $e_z[p, q]$ according to Equations 1 and 2.

Additionally, an output value for the first equalized signal $e_x[p, q]$ may be outputted through a horizontal direction (x) path along down-track (S400).

The first equalized signal $e_x[p, q]$ may be inputted into the down-track detection unit 30. The down-track detection unit 30 may detect a signal through the horizontal direction (x) path along down-track as shown in Equation 3 by applying the first equalized signal ($e_x[p, q]$) to the soft output Viterbi algorithm (SOVA). That is, the down-track detection unit 30 may output an output value $s_x[p, q]$ corresponding to the horizontal direction (x) PR target using the first equalized signal $e_x[p, q]$ outputted from the down-track equalization unit 10 as an input signal.

Additionally, an output value for the second equalized signal $e_z[p, q]$ may be outputted through a first vertical direction ($z_1$) path along cross-track (S500), and an output value for the second equalized signal $e_z[p, q]$ may be outputted through a second vertical direction ($z_2$) path along cross-track (S600).

The second equalized signal $e_z[p, q]$ may be inputted into each of the first cross-track detection unit 33 and the second cross-track detection unit 35. The first cross-track detection unit 33 and the second cross-track detection unit 35 may output two output values $s_{z1}[p, q]$, $s_{z2}[p, q]$ corresponding to the vertical direction (z) PR target using the second equalized signal $e_z[p, q]$ as an input signal.

To this end, the first cross-track detection unit 33 and the second cross-track detection unit 35 may generate the first vertical direction ($z_1$) path and the second vertical direction ($z_2$) path along cross-track respectively. This will be described with reference to FIG. 6.

Figure 6:
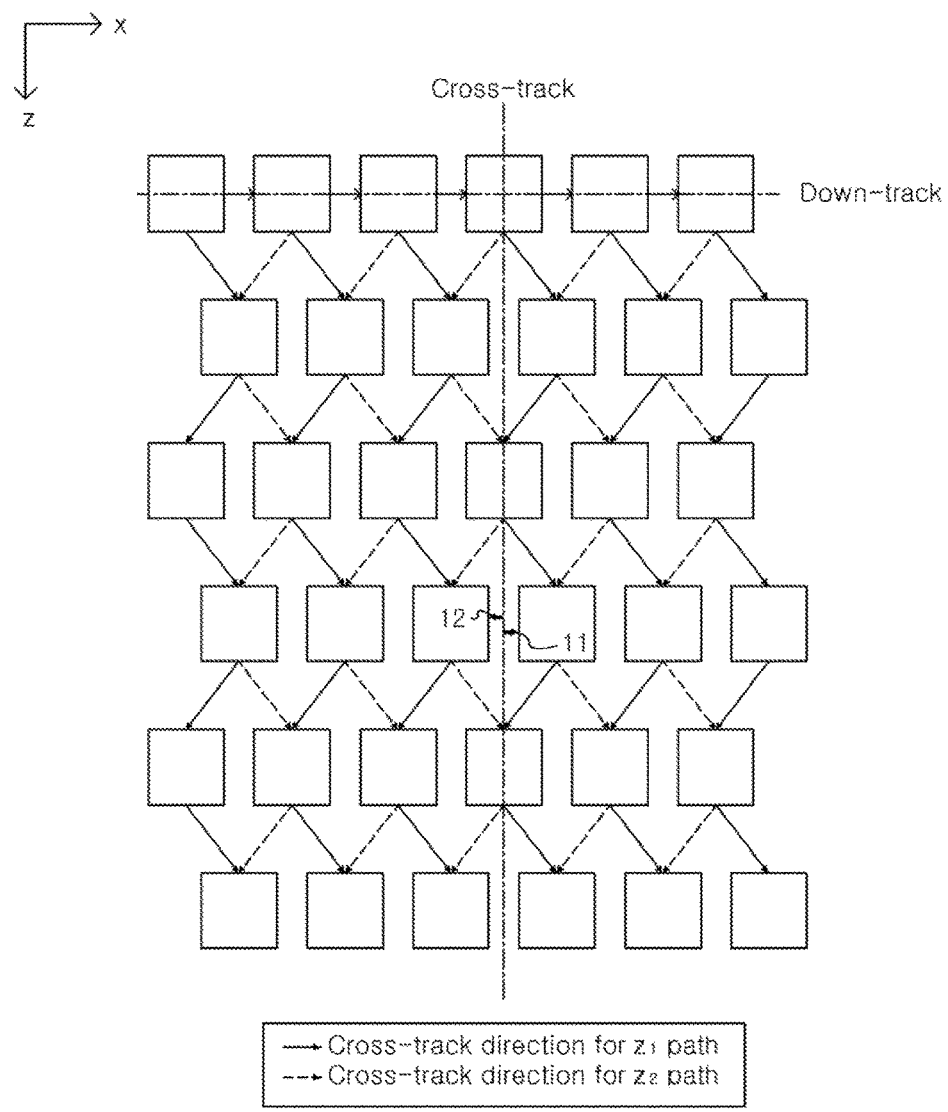
FIG. 6 is a diagram illustrating a method of generating three paths for signal detection according to the present disclosure.

FIG. 6 is a diagram illustrating a method of generating three paths for a signal detection according to the present disclosure.

Referring to FIG. 6, the signal detection method of the staggered 2D bit-patterned media according to an embodiment of the present disclosure may generate two paths including a first vertical direction ($z_1$) path and a second vertical direction ($z_2$) path along cross-track.

As described above, the 2D bit-patterned media of the present disclosure may be such that a plurality of pixels arranged at equal distances along down-track of horizontal direction (x) is arranged in a staggered manner with a plurality of pixels arranged along adjacent down-track. That is, a plurality of pixels may be arranged on the same line along cross-track perpendicular to down-track, or may be arranged in a staggered manner toward the horizontal direction (x) path 11 or its opposite path 12 with respect to cross-track.

The first vertical direction ($z_1$) path may be a path that allows for the passing through of a plurality of pixels arranged on the same line along cross-track and a plurality of pixels arranged in a staggered manner toward the horizontal direction (x) path with respect to cross-track.

That is, the first vertical direction ($z_1$) path may be a path in a zigzag shape passing through pixels arranged in a staggered manner closest to the horizontal direction (x) path with respect to cross-track from pixels arranged on the same line along cross-track.

The first cross-track detection unit 33 may generate the first vertical direction ($z_1$) path, and detect an output value $s_{z1}[p, q]$ along the first vertical direction ($z_1$) path using the second equalized signal $e_z[p, q]$ as an input signal. This is disclosed by Equation 4.

The second vertical direction ($z_2$) path may be a path that allows for the passing through of a plurality of pixels arranged on the same line along cross-track and a plurality of pixels arranged in a staggered manner toward the opposite path to the horizontal direction (x) path with respect to cross-track.

That is, the second vertical direction ($z_2$) path may be a path in a zigzag shape passing through pixels arranged in a staggered manner closest to the opposite path to the horizontal direction (x) path with respect to cross-track from pixels arranged on the same line along cross-track.

Therefore, the first vertical direction ($z_1$) path and the second vertical direction ($z_2$) path may have a symmetrical shape with respect to cross-track.

The second cross-track detection unit 35 may generate the second vertical direction ($z_2$) path, and detect an output value $s_{z2}[p, q]$ along the second vertical direction ($z_2$) path using the second equalized signal $e_z[p, q]$ as an input signal. This is disclosed by Equation 5.

Referring back to FIG. 4, an output signal may be calculated by averaging the output values (S700).

The output signal may be determined according to an average of the output value $s_x[p, q]$ detected along the horizontal direction (x) path, the output value $s_{z1}[p, q]$ detected along the first vertical direction ($z_1$) path, and the output value $s_{z2}[p, q]$ detected along the second vertical direction ($z_2$) path.

The averaging unit 50 may average the output values $s_x[p, q]$, $s_{z1}[p, q]$, $s_{z2}[p, q]$ outputted from the down-track detection unit 30, the first cross-track detection unit 33 and the second cross-track detection unit 35 as shown in Equation 6, and calculate an output signal $\hat{d}[p,q]$ for the input signal $d[p, q]$ according to the average value.

As described above, the signal detection method of the staggered 2D bit-patterned media according to an embodiment of the present disclosure may set a total of three signal detection paths including a path along one down-track direction and paths along two cross-track directions. Thus, according to the present disclosure, in the staggered 2D bit-patterned array, it is possible to pass through all affected adjacent pixels, thereby improving the signal detection performance.

Figure 7:
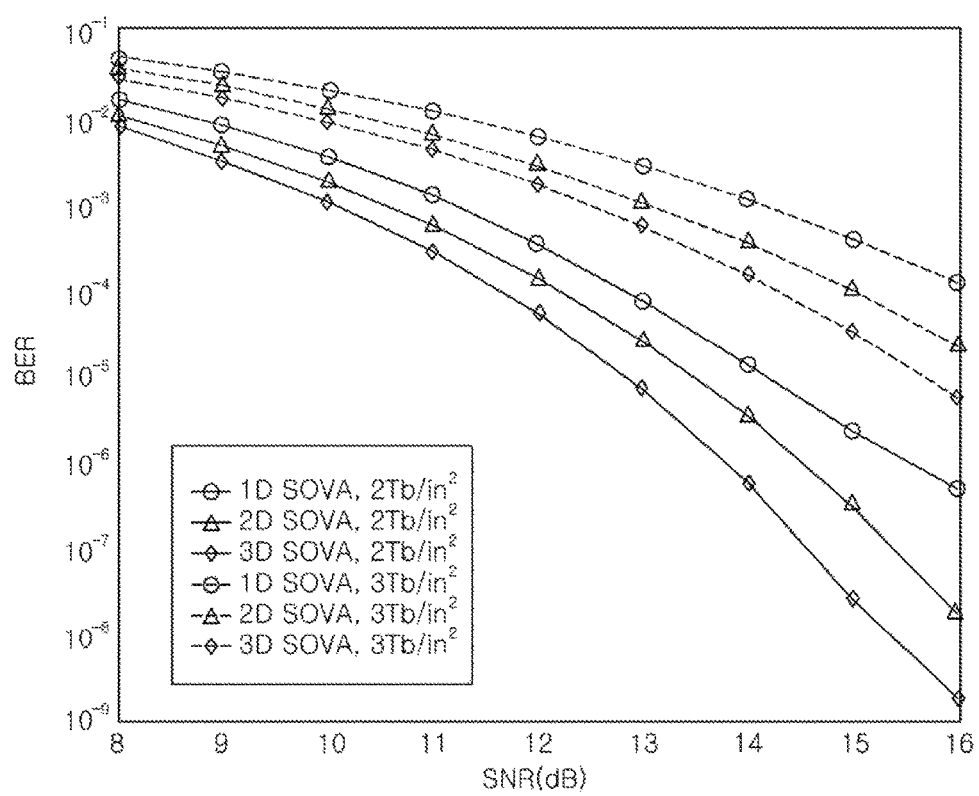
FIGS. 7 and 8 show the results of comparing simulation of the present disclosure and the conventional art to demonstrate the effect of the present disclosure.
Figure 8:
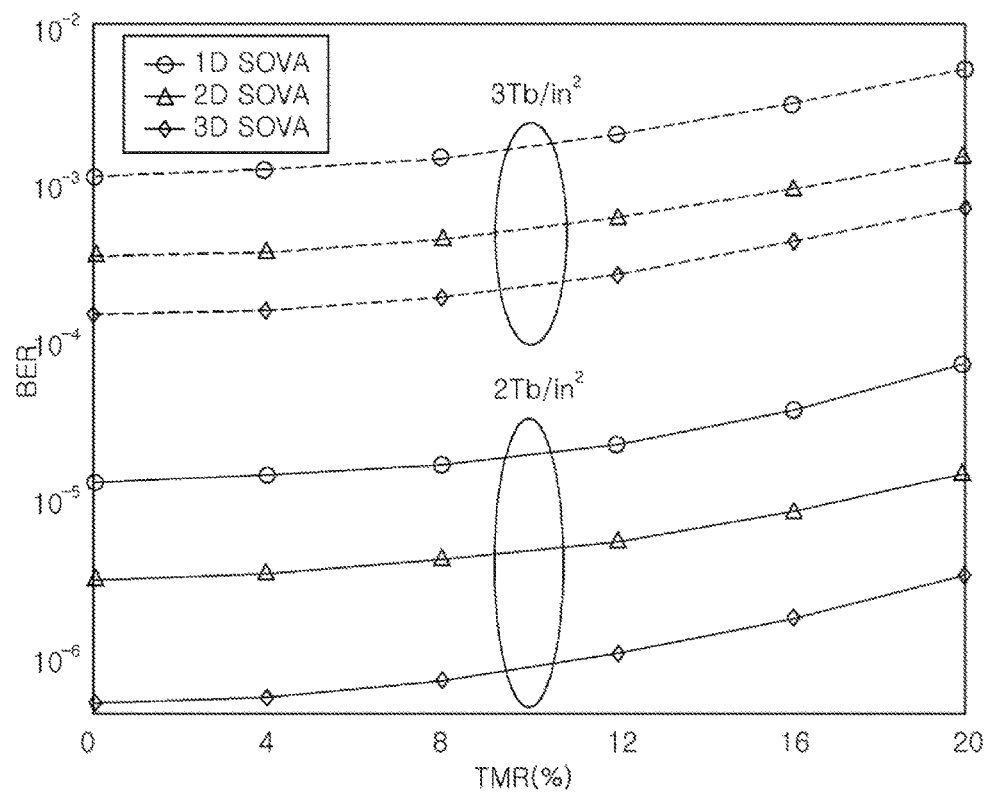

FIGS. 7 and 8 show a result of comparing simulation of the present disclosure and the conventional art to demonstrate the effect of the present disclosure.

The simulation according to FIGS. 7 and 8 is set such that the signal detection apparatus reads data per page, and the experiment is conducted with a total of 1000 pages. Each page is set to 1034×1084 bits. Additionally, as shown in FIG. 2, 2D bit-patterned media having a structure in which down-tracks are staggered by half are set. The down-track direction length $L_x$ and the cross-track direction length $L_z$ of pixels are equally set to 11 nm. The bit pitch $T_x$ and track pitch $T_z$ are equally set to 18 nm at 2 Tb/in$^2$.

Additionally, to investigate the performance of 2D bit-patterned media at 3 Tb/in$^2$, each of down-track ($T_x$) and cross-track ($T_z$) is set to 14.5 nm, and the MR head diameter and the pixel length are fixed. $PW_x$ and $PW_z$ for 2D pixel pulse response are set to 19.4 nm and 24.8 nm respectively. SNR is set to $10\log_{10}(1/\alpha^2)$, and the equalizer constant is set to 5×5 and updated by the LMS algorithm.

The following Table 1 shows Bit Error Rate (BER) in signal detection according to the present disclosure under different PR target conditions in the case of SNR=14. The down-track direction PR target constant $f_x[q]$ is set to ($\alpha$, 1, $\alpha$), and the cross-track direction PR target constant $f_z[p]$ is set to ($\beta$, 1, $\beta$).

TABLE 1

| | β | | | |
|---|---|---|---|---|
| α | 0.10 | 0.15 | 0.20 | 0.25 |
| 0.10 | 7.65 × 10$^{-7}$ | 5.36 × 10$^{-7}$ | 7.57 × 10$^{-7}$ | 1.85 × 10$^{-6}$ |
| 0.15 | 7.14 × 10$^{-7}$ | 5.27 × 10$^{-7}$ | 6.97 × 10$^{-7}$ | 1.76 × 10$^{-6}$ |
| 0.20 | 7.40 × 10$^{-7}$ | 5.02 × 10$^{-7}$ | 6.72 × 10$^{-7}$ | 1.64 × 10$^{-6}$ |
| 0.25 | 1.03 × 10$^{-6}$ | 7.74 × 10$^{-7}$ | 8.08 × 10$^{-7}$ | 1.65 × 10$^{-6}$ |

It can be seen from Table 1 that the BER performance is best when α and β are 0.20 and 0.15 respectively.

Therefore, the down-track direction PR target constant is set to (0.20, 1, 0.20), and the cross-track direction PR target constant is set to (0.15, 1, 0.15). Additionally, a signal detection apparatus having one signal detection path (1D SOVA), a signal detection apparatus having two perpendicular signal detection paths (2D SOVA) and a signal detection apparatus having three signal detection paths (3D SOVA) according to the present disclosure are modeled.

FIG. 7 is a graph showing BER performance as a function of SNR, and FIG. 8 is a graph showing BER performance as a function of TMR in the case of SNR=14.

Referring to FIGS. 7 and 8, it can be seen that the signal detection apparatus having three signal detection paths (3D SOVA) according to the present disclosure has the improved BER performance as compared to the signal detection apparatus having one signal detection path (1D SOVA) and the signal detection apparatus having two signal detection paths (2D SOVA).

The signal detection method of 2D bit-patterned media according to the present disclosure as described above may be implemented as an application or in the form of program commands that can be executed through various computer components, and recorded in computer-readable recording media. The computer-readable recording media may include program commands, data files and data structures, alone or in combination.

The program commands recorded on the computer-readable recording media may be specially designed and configured for the present disclosure and may be known and available to those having ordinary skill in the field of computer software.

Examples of the computer-readable recording media include hardware devices specially designed to store and execute program commands, such as magnetic media such as hard disk, floppy disk and magnetic tape, optical recording media such as CD-ROM and DVD, magneto-optical media such as floptical disk, and ROM, RAM and flash memory.

Examples of the program commands include machine codes generated by a compiler as well as high-level language codes that can be executed by a computer using an interpreter. The hardware device may be configured to act as one or more software modules to perform processing according to the present disclosure, or vice versa.

While the present disclosure has been hereinabove described with reference to the embodiments, it will be apparent to those skilled in the corresponding technical field that a variety of modifications and changes may be made thereto without departing from the spirit and scope of the present disclosure set forth in the appended claims.

The invention claimed is:

1. A signal detection method of staggered two-dimensional bit-patterned media in which a first plurality of pixels arranged at equal distances along down-track are arranged in a staggered manner with a second plurality of pixels arranged along adjacent down-track, wherein the first plurality of pixels and the second plurality of pixels are arranged in turn, the signal detection method of the staggered two-dimensional bit-patterned media comprising:

a down-track detection step of detecting a horizontal signal through a horizontal direction (x) path along the down-track;

a first cross-track detection step of detecting a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track; and a second cross-track detection step of detecting a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

2. The signal detection method of the staggered two-dimensional bit-patterned media of claim 1, wherein comprises:

calculating an output signal by averaging output values outputted from the down-track detection step, the first cross-track detection step, and the second cross-track detection step.

3. The signal detection method of the staggered two-dimensional bit-patterned media of claim 1, wherein the first cross-track detection step comprises:

generating the first vertical direction ($z_1$) path in a zigzag shape passing through pixels arranged in a staggered manner closest to the horizontal direction (x) path with respect to the cross-track from pixels arranged on a same line along the cross-track; and detecting the first signal along the first vertical direction ($z_1$) path.

4. The signal detection method of the staggered two-dimensional bit-patterned media of claim 1, wherein the second cross-track detection step comprises:

generating the second vertical direction ($z_2$) path in a zigzag shape passing through pixels arranged in a staggered manner closest to an opposite path to the horizontal direction (x) path with respect to the cross-track from pixels arranged on a same line along the cross-track, the second vertical direction ($z_2$) path being symmetrical to the first vertical direction ($z_1$) path with respect to the cross-track; and detecting the second signal along the second vertical direction ($z_2$) path.

5. The signal detection method of the staggered two-dimensional bit-patterned media of claim 1, wherein comprises:

adding Additive White Gaussian Noise (AWGN) to an input signal to generate a readback signal;

adjusting the readback signal to a preset partial response (PR) target of the down-track to generate a first equalized signal;

adjusting the readback signal to a preset PR target of the cross track to generate a second equalized signal; and outputting output values by applying the first equalized signal to the down-track detection step, and the second equalized signal to the first cross-track detection step and the second cross-track detection step.

6. The signal detection method of the staggered two-dimensional bit-patterned media of claim 1, wherein the down-track detection step, the first cross-track detection step, and the second cross-track detection step comply with a soft output Viterbi algorithm.

7. A non-transitory computer-readable recording medium having thereon a computer program for performing a signal detection method of staggered two-dimensional bit-patterned media in which a first plurality of pixels arranged at equal distances along down-track are arranged in a staggered manner with a second plurality of pixels arranged along adjacent down-track, wherein the first plurality of pixels and the second plurality of pixels are arranged in turn, the signal detection method of the staggered two-dimensional bit-patterned media comprising:

a down-track detection step of detecting a horizontal signal through a horizontal direction (x) path along the down-track;

a first cross-track detection step of detecting a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track; and a second cross-track detection step of detecting a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

8. A signal detection apparatus of staggered two-dimensional bit-patterned media in which a first plurality of pixels arranged at equal distances along down-track are arranged in a staggered manner with a second plurality of pixels arranged along adjacent down-track, wherein the first plurality of pixels and the second plurality of pixels are arranged in turn, the signal detection apparatus of the staggered two-dimensional bit-patterned media comprising:

a processor and a memory;

a down-track detector which detects a horizontal signal through a horizontal direction (x) path along the down-track;

a first cross-track detector which detects a first signal through a first vertical direction ($z_1$) path that allows for passing through a cross-track plurality of pixels of the first plurality of pixels, wherein the cross-track plurality of pixels are arranged on a same line along a cross-track perpendicular to the down-track and a first vertical direction plurality of pixels of the second plurality of pixels arranged in a staggered manner toward the horizontal direction (x) path with respect to the cross-track; and a second cross-track detector which detects a second signal through a second vertical direction ($z_2$) path that allows for passing through the cross-track plurality of pixels of the first plurality of pixels, wherein the cross-track plurality of pixels are arranged on the same line along the cross-track and a second vertical direction plurality of pixels of the second plurality of pixels arranged in a staggered manner toward an opposite path to the horizontal direction (x) path with respect to the cross-track.

9. The signal detection apparatus of the staggered two-dimensional bit-patterned media of claim 8, further comprising:

an averaging unit which calculates an output signal by averaging output values outputted from the down-track detector, the first cross-track detector, and the second cross-track detector.

10. The signal detection apparatus of the staggered two-dimensional bit-patterned media of claim 8, further comprising:

a down-track equalizer which adjusts a readback signal to a preset partial response (PR) target of the down track to generate a first equalized signal, the readback signal in which Additive White Gaussian Noise (AWGN) is added to an input signal; and a cross-track equalizer which adjusts the readback signal to a preset PR target of the cross track to generate a second equalized signal.

* * * * *